Figure 1:
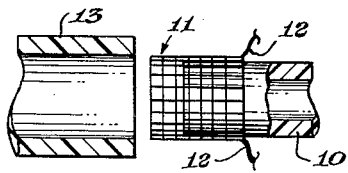

Oct. 30, 1962　　　G. E. GOULD ET AL　　　3,061,503
METHOD OF JOINING PIPES BY MEANS OF AN
ELECTRICALLY HEATABLE SLEEVE
Filed Oct. 29, 1956

INVENTORS.
Gordon E. Gould
BY　Robert S. Mason

Griswold & Burdick
ATTORNEYS

United States Patent Office

3,061,503
Patented Oct. 30, 1962

3,061,503
METHOD OF JOINING PIPES BY MEANS OF AN ELECTRICALLY HEATABLE SLEEVE
Gordon E. Gould, Breckenridge, Mich., and Robert S. Mason, San Diego, Calif., assignors to The Dow Chemical Company, Midland, Mich., a corporation of Delaware
Filed Oct. 29, 1956, Ser. No. 618,942
5 Claims. (Cl. 156—272)

Pipe, tubing and the various connecting fittings for accommodating its fabrication may advantageously be comprised of various thermoplastic resinous materials including, by way of illustration, polyethylene, chlorinated polyethylene, thermoplastified polyvinylchloride and like or similar plastic materials of construction.

Difficulty, however, has been encountered in simply and effectively joining thermoplastic pipe and fittings to achieve suitable installations. The use of screw fittings and clamping arrangements has not always provided satisfactory results. It is not uncommon, when such manner of coupling is utilized, to experience leaks and failures which may be the result of an improper initial engagement or fit between the pipe and the fitting to which it is coupled or that may subsequently be caused by "creep" or plastic distortion and deformation under load in the thermoplastic material or due to the relatively flexible character of the thermoplastic. In addition, it is an expensive and sometimes inconvenient and cumbersome requirement to provide threads on pipe in the manner of iron pipe fabricating practice or to employ clamps and clamping devices (which usually are of the clampable insert type of arrangement) for joining lengths of plastic pipe and the like.

Furthermore, conventional welding procedures are not especially suited to meet the needs that are generally involved for fabricating plastic pipe. On the other hand, the use of adhesives or solvents for making plastic pipe joints is often encumbered by requirements to practice fabricating specialties. It is also complicated by the length of time that is usually required to develop maximum bond strength in an adhesively joined pipe. On top of this, it may frequently be vexatious or impossible to find suitable adhesive substances for many thermoplastic resinous materials. Finally, there is always some uncertainty over the commensurate inertness to various materials that should be a common characteristic of both the adhesive joint and the plastic pipe on which it is utilized.

It would be an advantage to be able to join plastic pipe and fittings and other plastic articles (including those having non-circular, and polygonal, rectangular and square cross-sections) with exceptionally strong, secure and dependable fastenings in a quick, simple and expeditious manner which did not require expensive or specialized tools for the purpose and could be accomplished readily by ordinarily gifted craftsmen. It would be particularly beneficial if such an improved fastening technique would obviate the difficulties involved in joining plastic pipe and like articles according to conventional fabricating procedures.

To the accomplishment of these and related ends, this invention has reference to, and has principally amongst its objectives, the provision of an improved and superior technique for joining pipe, fittings and like or analogous articles of thermoplastic resinous materials.

The improved technique of the present invention comprises providing between pipe and fitting members or between other articles of thermoplastic resinous material which are adapted to be joined in an overlapping, contiguous relationship in a slipfitting manner of combining engagement a foraminous, grid-like, electrically heatable resistance sleeve element, preferably metallic in nature, that interfits and is substantially conterminous with the interfacing wall surfaces intended to be overlapped and contiguously engaged; positioning said grid-like heatable sleeve element against the interfacing wall surface of one of said members; electrically energizing said heatable sleeve element while it is so disposed against one of said members to generate sufficient heat in said element to fuse the thermoplastic material adjacent thereto; slipping the other member into overlapping engagement with the first member while the thermoplastic material is in a fused condition to force said material to envelop said heatable sleeve element and flow against the contiguous interfacial wall surface of said member being slipped into contiguous overlapping engagement; and welding said pipe and fitting or the like members together into permanent sealed engagement by cooling the fused interfacial portion of the thermoplastic resinous material in said adjoined members. Advantageously, the electrical energization of the heatable sleeve element may be continued for a sufficient period after the members have been slipped together in overlapping relationship to interfuse material from the interfacial wall surfaces of both members being joined.

As is apparent, practice of the invention is best performed with lap type fittings. It is beneficial for the heatable element to interfit between all of the adjoining area of the interfacial wall surfaces that are to be contiguously joined. It is generally suitable to provide the heatable element about the male joint before making the assembly. It is frequently advantageous to utilize a generally conical or tapered heatable element, especially when round articles, such as pipe and tubing, are to be joined. It sometimes may be particularly advantageous to utilize a conical or tapered element with either a conical or tapered male or female fitting, particularly the latter, in which instance it may be especially utile to dispose the heatable element against the female fitting before slipping together the members that are intended to be joined. In a great number of instances, especially when tapered members or tapered heatable sleeve elements, or both, are involved, optimum results from practice of the invention may be achieved when the interior diameter or other interior dimensions of the female member is (or are) about the same or even slightly smaller than the exterior diameter (or other dimensions) of the male member. In such cases, the heating is best definitely continued throughout the slip fitting of the members to insure fusion of the interfacial plastic material on both members so as to better accomplish the desired joinder.

Further features and advantages of the invention are manifest in the several views of the accompanying drawing which depicts various embodiments of the invention and wherein, in so far as may be possible, like reference numerals refer to like or analogous parts.

Figure 2:
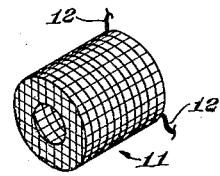
Figure 3:
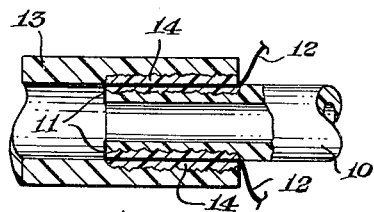
Figure 5:
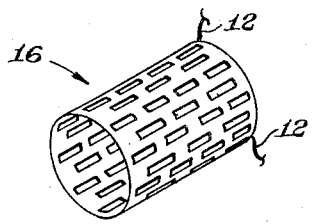

In FIGURE 1, a plastic pipe 10 is shown being provided with a basket-type, grid-like, foraminous (or screen mesh) heatable sleeve element 11 (shown in perspective in FIGURE 2) which fits in a cap-like manner over the male end of the pipe. The leads 12 from the sleeve element 11 facilitate completion of an electrical circuit for energization in order to heat the element. As is apparent, they should be sized suitably to meet the current-carrying requirements involved. The sleeve element that is employed may advantageously be either a woven wire product or the like, as is schematically depicted in the first figure of the drawing, or as is illustrated in FIGURE 5 and hereinafter discussed, it may be of perforated sheet stock. When the sleeve element 11 is disposed about the pipe, it is heated to fuse the plastic on the surface of the pipe. It is then inserted in the female fitting 13, advantageously with continued heating (especially if the interior dimension of the female member is slightly smaller than the exterior dimension of the male member), to cause the plastic material to envelope the grid-like sleeve element 11 and interfuse in the contiguous areas of the interfacial wall surfaces. The resulting interfused ring or looping band of plastic material in the interfacial surfaces is depicted in FIGURE 3, showing the joined members, as the outlined section that is designated by the reference numeral 14. A wide, tight, secure and dependable joint is thus formed upon cooling of the interfused thermoplastic resinous material.

Figure 4:
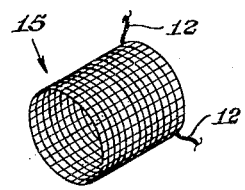

A plain cylindrical woven screen sleeve element, as designated by reference numeral 15 in the perspective view of FIGURE 4 may also be desirable to employ. Such a device may be particularly beneficial when the piping system is intended to convey corrosive materials and contact with the metallic element used to join the pipe may best be avoided. A plain cylindrical sleeve element, as is apparent, becomes completely enveloped in the interfused plastic and is thus protected from any contact with materials being handled in the piping.

As has been mentioned, the heatable sleeve element may also be prepared from punched, stamped or otherwise perforated sheet stock. This is illustrated by the element 16 in FIGURE 5. In such cases, although side staggered slots have been shown, the perforations may be slots, oblongs or round holes arranged in either an end or side staggered disposition, as may be desired.

Figure 6:
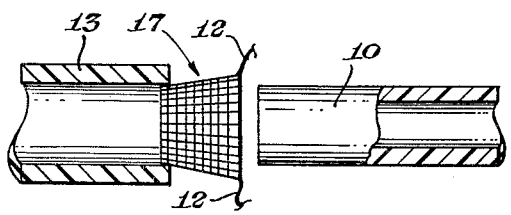
Figure 7:
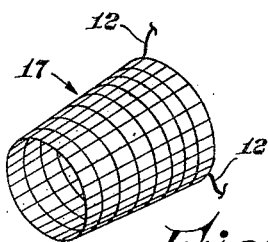

FIGURE 6 illustrates a conical or tapered heatable sleeve element 17 which is also shown perspectively in FIGURE 7. Such an element, though shown as a woven wire product, may also be from perforated sheet stock. Generally, a 5 to 10 degree taper is suitable in this type of heatable sleeve element which is utilized in the same general manner described in connection with a basket-type or plain cylindrical foraminous element.

Figure 8:
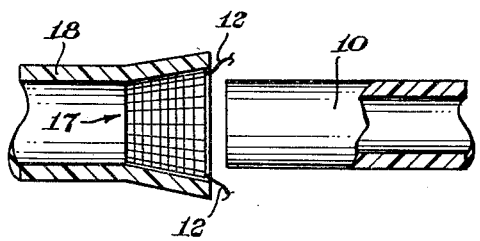
Figure 9:
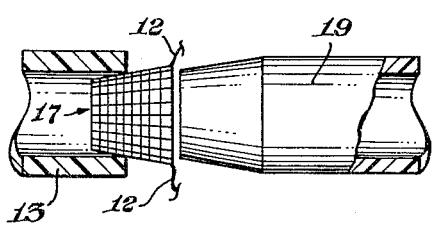

A conical or tapered female fitting or member 18 and a conical or tapered inserting end of a pipe or other male member 19 are illustrated (in combination with a conical heatable sleeve element 17) in FIGURES 8 and 9, respectively. A 5 to 10 degree taper is also generally suitable for such joinable members. Although in FIGURES 8 and 9 the tapered members are each illustrated before being joined with conventional cylindrical members, it is apparent that members can also be fastened together effectively in the practice of the invention when they are both provided with tapered joint ends. In this connection, it is usually more expedient to utilize tapered female members, such as fittings, since they can be made readily at the factory. Tapered or conical male inserting members might have to be custom fabricated in the field and thus might cause some inconvenience in use.

The foraminous, grid-like heatable sleeve element has little tendency to short out in the practice of the invention as may occur with plain windings or heatable coils of resistance wire. It may be made from any type of electrically conducting metal wire, strip, or perforated sheet stock or from other electrically heatable materials. If desired, the sleeve element may be plastic coated. In such cases, it is usually desirable for the same or a similar plastic material to be used for coating the sleeve element as is present in the pipe or other joinable articles. Likewise, any source of electricity may be employed for energizing the element provided it is capable of heating it to a plastic fusing temperature. It is usually advantageous and convenient to employ copper, bronze, brass, Monel, aluminum or stainless steel for the electrically heatable element. Wire or other strip stock having a diameter or equivalent dimension in the neighborhood of fifteen- to twenty-thousandths of an inch is ordinarily suitable for the fabrication of woven screen mesh type heatable sleeve type elements. About twenty-eight gauge sheet stock may generally be employed satisfactorily in perforated sheet elements.

Energization of the element may be effectively accomplished with a low voltage direct current source of electricity, such as a two volt wet cell or the like. Sometimes, it may be more expedient to employ generators as a source of electrical energy. The sleeve element should be fabricated with adjacent wires or solid conducting sections close enough together to insure that a solid interfused portion of plastic material, adapted to hydraulically and pneumatically seal the joint, will be formed in the overlapping interfacial areas of the members being joined. The openings in the heatable elements should usually be between about one sixty-fourth and three-sixteenths of an inch with about one-eighth of an inch being a frequently preferred dimension. The openings may be placed to assume either a square (or rectangular) or diagonal aligned disposition relative to the end of the pipe or other article being joined. In addition, it is generally desirable for the heatable sleeve element to have sufficient lateral length to provide an interfused band in the joint that is at least about half the outer diameter or other exterior dimension of the male member when relatively smaller articles up to about three inches in diameter or equivalent dimension are involved. When larger sized articles are being joined, the interfused band should usually be at least about three-quarters of an inch to an inch or so in length.

Care should be taken to avoid overheating the element which might cause the plastic to burn or otherwise decompose. It is merely necessary to form an interfused interfacial portion all about the joint in order to effect an efficient seal. The amount of heat to be generated with the heatable element, as will be apparent to those individuals who are skilled in the art, depends to a large measure in particular cases on the fusion temperature and the mass or quantity of the thermoplastic material involved.

Articles joined in accordance with the invention, including pipe and fittings, have exceptionally strong, smooth, essentially monolithic connections that are easily capable of withstanding hydrostatic and pneumatic pressures which are at least equivalent to the bursting strength of the component members. Such features are oftentimes impossible to obtain by the more conventional fabricating procedures that have been described herein.

What is claimed is:

1. Technique for joining pipe, fittings and other articles of thermoplastic resinous material which comprises providing between male and female members that are adapted to be joined in an overlapping, contiguous relationship and in a slip-fitting manner of combining engagement a foraminous, grid-like, electrically heatable sleeve element that interfits and is substantially coterminous with the interfacing wall surfaces intended to be overlapped and contiguously engaged; positioning said sleeve element against an interfacing wall surface of one of said members; electrically energizing said sleeve element by means of an electrical circuit having direct current continuity while it is so disposed to generate sufficient heat to fuse the thermoplastic material adjacent thereto; slipping the other member into overlapping engagement with the first member while the thermoplastic material is fused to force said fused material to envelope said sleeve element and flow against the contiguous interfacial wall surface of said member being slipped into engagement; and welding said members into permanent sealed engagement by cooling the fused interfacial portion of the thermoplastic resinous material in said adjoined members.

2. The recitation of claim 1, including the step of heating the sleeve element during said slipping of the members together.

3. The recitation of claim 1, wherein said heatable sleeve element is tapered.

4. The recitation of claim 1, wherein at least one of said plastic members is tapered.

5. The recitation of claim 1, wherein the female plastic member is tapered and said heatable sleeve element is tapered and initially provided against the interior wall surface of said female member.

References Cited in the file of this patent

UNITED STATES PATENTS

| | | |
|---|---|---|
| 1,960,120 | Mohring | May 22, 1934 |
| 2,372,929 | Blessing | Apr. 3, 1945 |
| 2,542,702 | Prow | Feb. 20, 1951 |
| 2,642,911 | De Shazor | June 23, 1953 |
| 2,713,017 | Bruns | July 12, 1955 |
| 2,721,159 | Johnston | Oct. 18, 1955 |
| 2,739,829 | Pedlow et al. | Mar. 27, 1956 |

FOREIGN PATENTS

| | | |
|---|---|---|
| 26,644 | Great Britain | 1898 |